United States Patent [19]

Lindblad

[11] 4,151,967
[45] May 1, 1979

[54] DEVICE FOR STRETCHING A BAND FORMING PART OF A SAFETY BELT FOR VEHICLES

[75] Inventor: Oskar L. Lindblad, Vårgårda, Sweden

[73] Assignee: Autoliv AB, Vårgårda, Sweden

[21] Appl. No.: 804,246

[22] Filed: Jun. 7, 1977

[51] Int. Cl.² .................. B65H 75/48; A62B 35/00
[52] U.S. Cl. .................. 242/107.4 R; 244/122 B; 280/744
[58] Field of Search .......... 242/107, 107.4 R–107.4 E; 244/122 B; 280/744–747; 297/388; 180/82 C

[56] References Cited
U.S. PATENT DOCUMENTS

| 3,077,324 | 2/1963 | Strickland | 242/107.4 B |
| 3,984,127 | 10/1976 | Bendler et al. | 242/107.4 R |
| 4,014,479 | 3/1977 | Nilsson | 242/107.4 R |

Primary Examiner—Robert W. Jenkins
Assistant Examiner—John M. Jillions

[57] ABSTRACT

Device for stretching a band forming part of a safety belt for a vehicle which takes up any slack of the band and stretches same towards the body of a user when there is an abnormal change in the speed of the vehicle comprising a rotatably mounted winding-up core for the band having a cam at one end located within a housing, an arm journalled in the housing and pivotable between a position in the path of movement of the cam and a position outside of said path. In the inactive condition of the device the free end of the arm is positioned in the path of movement of the cam and defines with a surface of the cam and the walls of the housing a closed expansible chamber. An ignitable gun powder charge is held in the free end of the arm and there is means for igniting same when there is an abnormal change in speed to cause expansion of the chamber, rotation of said cam and movement of said arm to outside of the path of movement of the cam, and rotation of the core in the winding-up direction.

8 Claims, 3 Drawing Figures

U.S. Patent
May 1, 1979
4,151,967
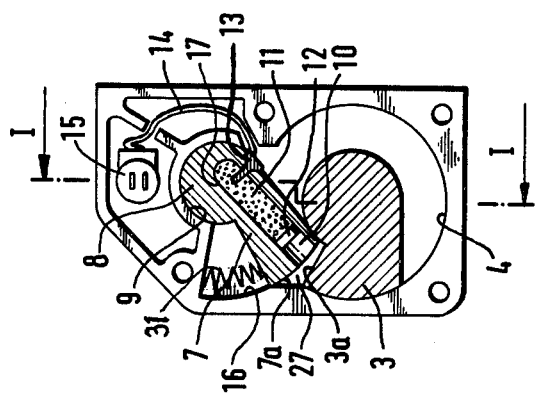
FIG. 2
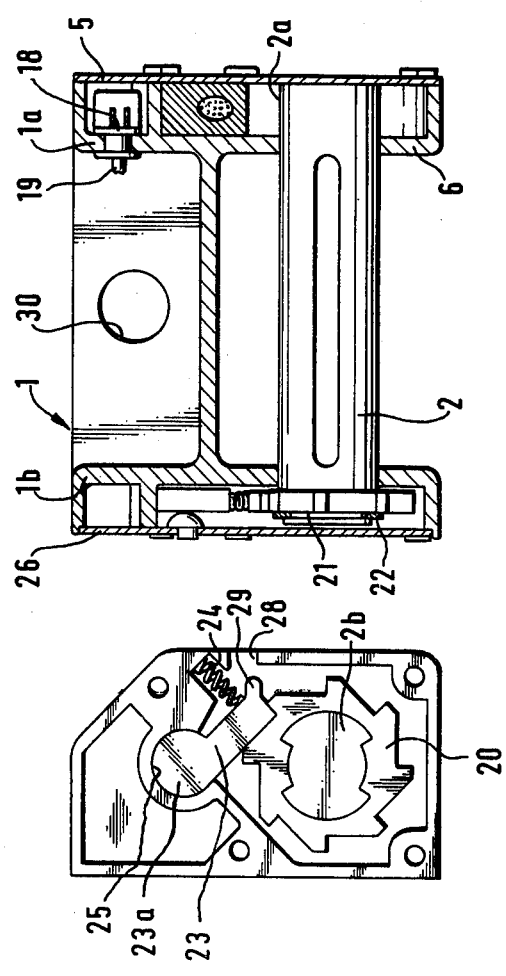
FIG. 1
FIG. 3

DEVICE FOR STRETCHING A BAND FORMING PART OF A SAFETY BELT FOR VEHICLES

The present invention relates to a device for stretching a band forming part of a safety belt for vehicles and comprising a power means, which can be activated by means of a member sensing abnormal changes of speed and in activated condition shortens the active portion of the safety belt.

It is a principal object of the invention to provide a device of the kind mentioned, which has a secure design, requires comparatively little space, and which is simple to manufacture.

A safety belt in order to be approved must at least on the occasion, when it is active, with a certain force be stretched over the person using the safety belt. This stretching of the band of the belt is often felt as annoying by the user. In order to avoid these annoying pressure forces against the user, it is suitable to let the safety belt have a certain slack, when it is in normal use. However, if the safety belt shall function in a satisfactory manner in an accident, this slack must be rapidly eliminated. It is an object of the invention to provide a device, which effectuates the necessary stretching in a rapid, efficient, and reliable manner in connection with abnormal changes in the speed of the vehicle, which can be caused by way of example by a collosion.

The invention is substantially characterized by a winding-up device, in which the winding-up core for the band by actuation of the power means is rotatable in the winding-up direction in order to take up a possible slack of the band and to stretch the band towards the body of the user, the band core at the same time being under the bias of a one way blocking means, which permits a comparatively free rotation in the winding-up direction and counteracts rotation in the unwinding direction.

An embodiment of the object of the invention is described in the following, reference being made to the accompanying drawing, in which FIG. 1 is an axial crossection through a winding-up device, designed according to the invention, in a plane laid along the line I—I of FIG. 2, FIG. 2 is a view as seen from the right of the stretching device illustrated in FIG. 1, an end lid on this side being removed, and FIG. 3 is a view as seen from the left of the winding-up device likewise with an end lid on this side removed.

The winding-up device illustrated in the drawing comprises a stand 1, in which a winding-up core 2 for a band is rotatably mounted. The stand 1 at one end of the winding-up core 2 for the band has a housing 1a, which forms a bearing for this end of the winding-up core for the band and also houses a power means arranged in activated condition to give the winding-up core 2 for the band a rotating movement in the winding-up direction. At the other end of the winding-up core 2 for the band the stand is designed with another housing 1b, which forms the bearing for this end of the core and also houses a one way blocking means, which will be described more in detail below. The part of the core 2, which is located in the housing 1a, has a cam 3 radially projecting from the cylindrical end portion 2a of the shaft penetrating into the housing, which cam has a surface 3a extending substantially in radial direction. The housing 1a has an inside cylindrical wall surface 4 located coaxially relative to the central axis of the core 2, the top of the cam 3 following so close to the wall surface 4 that it is substantially a tight fit. The housing 1a is closed to the outside by means of an end lid 5. The cam 3 has an axial extension, which corresponds to the distance between the wall 6 of the end housing 1a and the end lid 5. A pawl-like arm is indicated with 7 and has substantially the same axial extension as the cam 3. The arm 7 has a cylindrical bearing end portion 8, which rests in a groove 9 shaped in the end housing 1a. At the free end of the arm 7 facing the cam surface 3a a bottom hole 10 extending along the same is made, in which hole a charge 11 is placed preferably comprising gun powder, which, when activated, produces a gas pressure, said charge being enclosed in the bore 10 by means of a sealing lid 12. A priming penetrating into the charge is indicated with 13 and is electrically connected with a tap contact 15 via a circuit 14. The arm 7 is pivotable in a hollow chamber 16 shaped as the sector of a circle, the transverse walls of which are located at a distance in between them, which substantially corresponds to the extension of the arm in this direction. The center of the bore 10 is located on the same side of the pivoting center 17 of the arm as the core 2. By this arrangement a moment is created, when the charge 11 is activated, tending to press the arm 7 against the cylindrical end portion 2a of the core. The arm can suitably be perpetually biassed by a light spring force, for example, by spring 31 shown in FIG. 2, in this direction. The tap contact 15 is suitably designed in such a manner that it can be coupled together with a tap contact 18 rigidly attached to the stand 1, which tap contact 18 by means of a circuit 19 is connected to a member (not shown) mounted in a suitable location of the vehicle and sensing abnormal changes in speed of the vehicle and when such changes do occur, give the priming 13 a current pulse. Between the end portion 2a of the shaft, the end surface 7a of the arm 7, the cam surface 3a, the end walls of the end housing 1a, and the cylindrical wall 4a space of arc shape is formed, which can expand, the expansion taking place in its longitudinal direction by displacement of the wall 3a, which in its turn results in a rotation of the band core 2. The other end of the band core 2, which is journalled in the wall of the housing 1b, supports a ratchet wheel 20, which is threaded on a non round portion 2b of the shaft and locked by means of spring washer 22 engaging a peripheral groove 21 in the end portion of the shaft. A pawl 23 cooperates with the ratchet wheel 20, said pawl being spring loaded in the direction of engagement by means of a pressure spring 24. The pawl 23 has the shape of an arm, one end portion 23a of which having the shape of a cylinder extending in the axial direction, and which is journalled in a cylindrical groove 25 shaped in the housing 1b, the end of which groove can be exposed by removing a lid 26, which closes the housing 1b in the axial direction. The pawl 23 can easily be dismounted or mounted by being axially pushed out of or pushed into the groove 25. In a corresponding manner the arm 7 holding the charge 11 can be exchanged.

When the sensing member senses an abnormal change of the movement of the vehicle, a current pulse is sent via the circuit 19, the contact parts 18 and 15, and the circuit 14 to the priming 13, which activates the charge 11, which creates a gas pressure, which moves aside the lid 12 and thereby gives the band core a rotating movement, which in its turn brings about a winding-up of the band forming part of the safety belt in question and fastened to said band core. The band core is prevented from making a retrograde rotation by the one way blocking means 20,23, which, however, can be manually released by for example a screw driver being introduced through the opening 28 of the housing 1b and forced against the terminal projection 29 of the arm 23. On account of the bore holding the charge 11 having an extension, which is directed somewhat at the side of the pivoting shaft 17, the same is kept pressed against the core portion 2a by the force of the moment created in the pivoting direction.

The device illustrated and described above can be used in connection with any safety belt, where a stretching of the band is required in for example an accident. If a collision has taken place, the device shown is not unfit for further use, but it can easily be restored by exchange of the pulse giver 7 for gas pressure and disengagement of the one way blocking means, at the same time as band wound up on the core is unwound.

The device illustrated is not sensitive in respect to its position, but can be placed in a part of the vehicle, which with regard to space is suitable. It may be suitable to mount the stretching device in connection to a fixation point of the band, or let the same serve itself as this point of fixation. The hole 30 illustrated in the drawing is provided to be used in connection with the mounting of the device in the car body.

The band core and its end portion 2a with the cam 3 can suitably be made of comparatively heavy material as by way of example zinc, which after activation on account of its inertia can give a rotating movement to the band core 2 of more than one revolution. This rotation is made possible by the arm 7 being permitted to pivot between the position illustrated in FIG. 2, in which the same penetrates into the path of movement of the cam 3, and a position, in which the cam is pivoted out of this path of movement.

The invention is not limited to the embodiment described and illustrated in the drawings, but the device can be varied as to its details within the scope of the following claims without therefore departing from the fundamental idea of the invention.

1. Device for stretching a band forming part of a safety belt for a vehicle, said device shortening the active portion of the safety belt by taking up any slack of the band and stretching same towards the body of a user in response to abnormal changes of speed of the vehicle, comprising a winding-up core for the band, a housing forming a bearing for one end of said core, a bearing for the other end of said core whereby said core is rotatably mounted, a cam provided at said one end of said core, and located within said housing, said cam having a surface extending substantially in a radial direction, an arm journalled in said housing outside of the outer contour of the cam and pivotable in a plane transverse to the longitudinal axis of the winding-up core between a position in the path of movement of the cam and a position outside of said path of movement, the free end of said arm being positioned in the inactive condition of said device in said path of movement of said cam to define with said cam surface and the walls of said housing a closed expansible chamber, a charge supported in said free end of said arm, which charge when activated produces a gas pressure, and means for activating said charge in response to abnormal changes of speed of the vehicle whereby the pulse of the gas pressure produced acts on said cam surface and causes said chamber to expand, thereby rotating said cam and moving said arm to its position outside of the path of movement of said cam and rotating said core in the winding-up direction.

2. Device according to claim 1, wherein said expansible chamber has the shape of an annular groove, one end wall being comprised of the free end of said arm and another end wall being comprised of said cam surface, the chamber inside being defined by a cylindrical end portion of the core from which the cam projects and outwardly being defined by a cylindrical end wall of the housing to which the top of the cam has a tight fit.

3. Device according to claim 2, wherein said arm has a longitudinal bottom hole which debouches at the free end of said arm which faces said cam surface, said hole enclosing said charge.

4. Device according to claim 3, wherein said charge is an electrically ignitable gun powder charge.

5. Device according to claim 1, wherein said arm has a cylindrical bearing portion journalled in a groove provided in said housing, one end of said groove being formed by a detachable end lid which also forms an outer end wall of said housing, whereby said end of the groove can be opened.

6. Device according to claim 1, wherein there is provided a one way blocking means for said winding-up core located in a second housing which also forms said bearing for the other end of said core, said blocking means comprising a ratchet wheel on said core and rotatable therewith, a pawl having a free end cooperable with said wheel and being in the form of an arm having a cylindrical bearing portion extending parallel to said core, said bearing portion being journalled in a groove of a correspondingly cylindrical shape provided in said second housing, one end wall of said groove being removable to open same to permit mounting and demounting of said pawl by axial displacement of the same.

7. Device according to claim 3, wherein the center axis of said bottom hole is located on the same side of the pivoting center of said arm as the core, whereby the arm when said charge is activated is pressed against the end portion of the core.

8. Device according to claim 1, wherein said arm is loaded by spring pressure tending to keep same biased towards the end portion of said core.

* * * * *